United States Patent [19]
Covill

[11] Patent Number: 5,375,757
[45] Date of Patent: Dec. 27, 1994

[54] FIXTURE FOR SUPPORTING A CABLE CONDUCTOR DURING A SOLDERING OPERATION

[75] Inventor: Daniel A. Covill, Melbourne, Fla.

[73] Assignee: DBA Systems, Inc., Melbourne, Fla.

[21] Appl. No.: 168,259

[22] Filed: Dec. 17, 1993

[51] Int. Cl.$^5$ .............................................. B23K 3/06
[52] U.S. Cl. ..................... 228/46; 228/49.1; 118/421
[58] Field of Search .............. 228/46, 49.1, 40; 118/421

[56] References Cited
U.S. PATENT DOCUMENTS 3,937,388  2/1976  Zimmerman ................... 228/222
4,135,573  1/1979  Sutler ................................ 228/46

Primary Examiner—Kenneth J. Ramsey
Attorney, Agent, or Firm—Pollock, Vande Sande & Priddy

[57] ABSTRACT

A cable soldering fixture which supports a cable conductor during soldering. A heat sink is supported at one end of a support frame for maintaining a cable being soldered parallel to the axis of a support frame. A tool elevator is supported by a guide plate so that it is movable along an axis parallel to the support frame and coincident to the axis of the cable. The end of the tool elevator is connected to a solder tool which can be accurately positioned adjacent an end of the cable conductor. The tool elevator may either support a solder pot for tinning the exposed conductor or a connector chuck for maintaining a connector aligned with the cable conductor during a soldering operation.

13 Claims, 9 Drawing Sheets

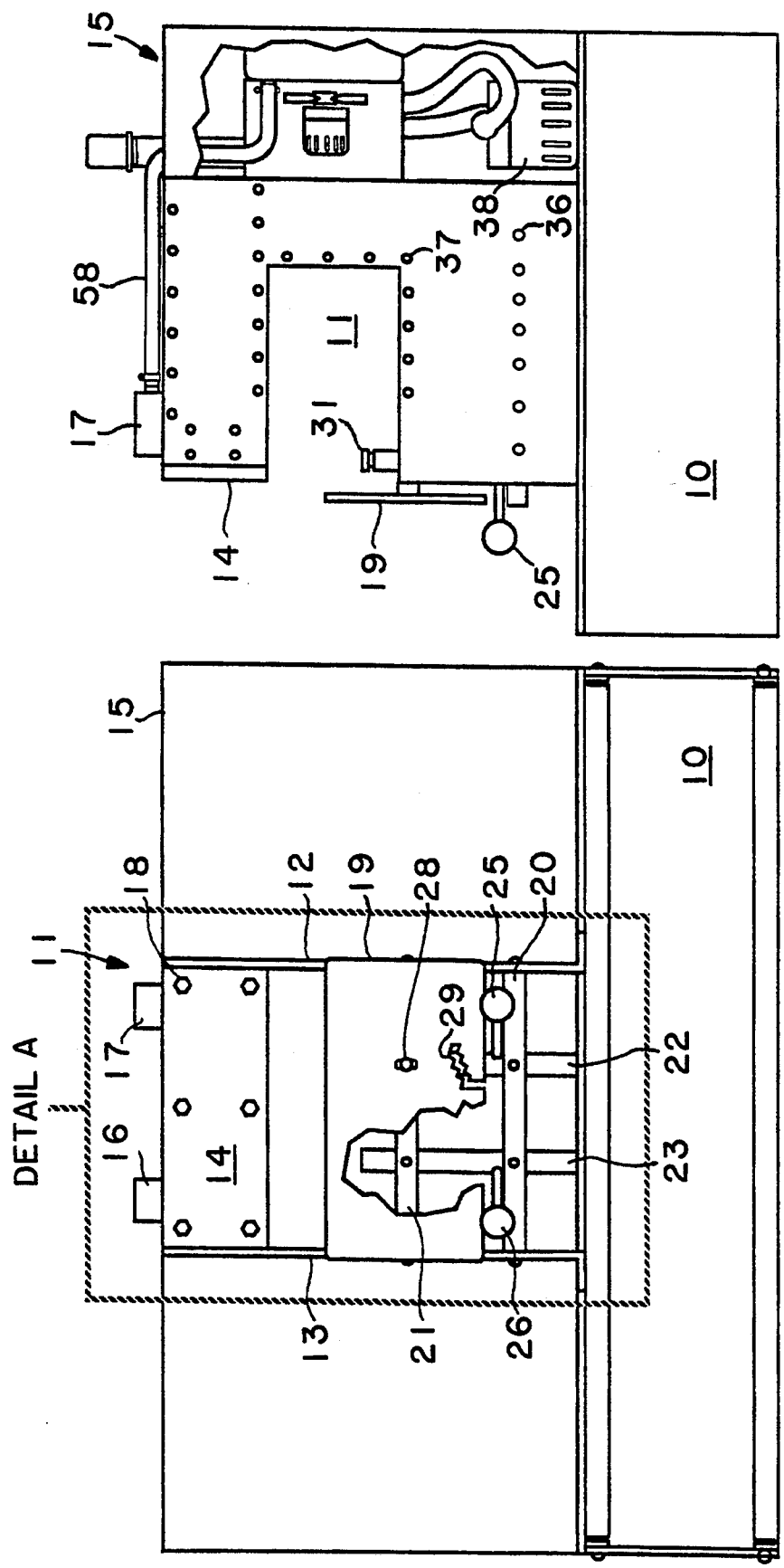

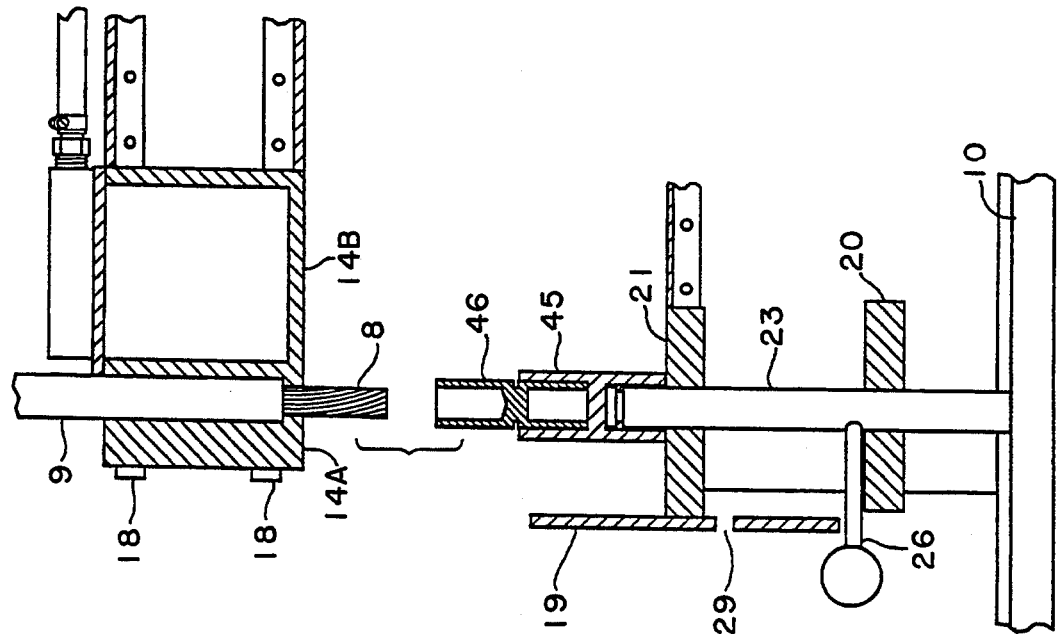
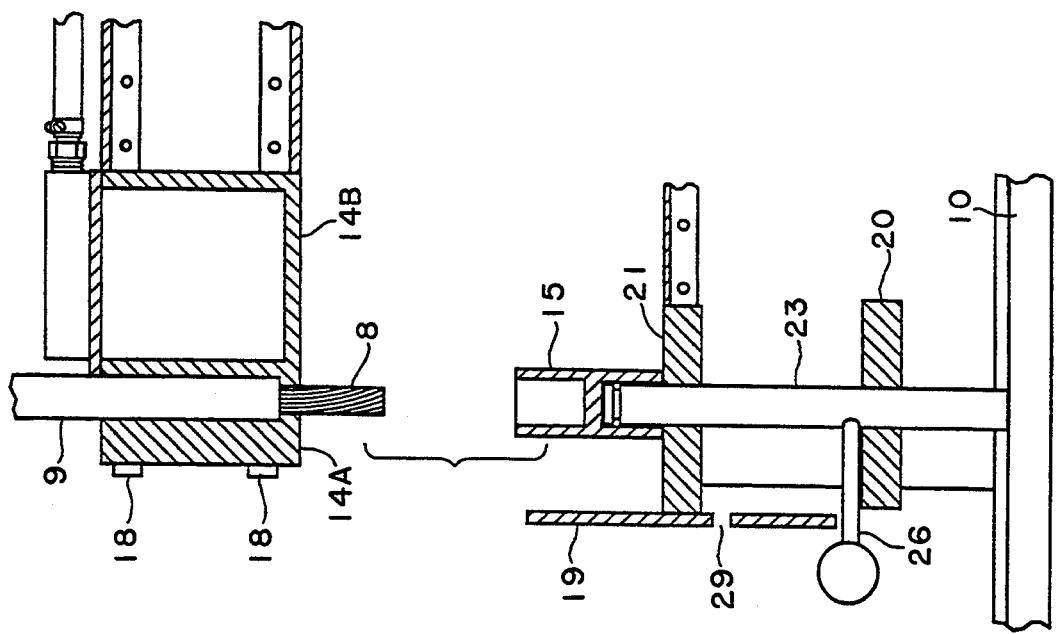

FIXTURE FOR SUPPORTING A CABLE CONDUCTOR DURING A SOLDERING OPERATION

The present invention relates to devices for soldering cable conductors. Specifically, a soldering fixture is provided which simultaneously cools a cable conductor and maintains the cable conductor and a connector in an aligned position during a soldering operation.

Soldering techniques for attaching the cable conductors to connectors are well-established in the industry. These techniques provide for the joining together of conductors and connectors using molten solder. In smaller-gauge wires, common problems resulting from application of heat are overcome using anti-wicking tools. These devices maintain the heat flow in a conductor at a safe level, such that the heat does not transfer to that portion of the cable which is not being soldered. Further, these tools prevent wicking of the solder, i.e., solder travel through capillary action into that portion of the conductor which is outside the joint formed with the connector.

These techniques have been well-developed with respect to small-gauge wire and connectors. However, as the size of the cable conductors increase above 8-gauge, significant difficulties are encountered in maintaining the larger-diameter cables safe from excessive heat and from the problem of solder wicking. Further, the larger-mass cable conductors and connectors require much more heat, and are slower to cool than smaller conductors and the correspondingly smaller connectors. During the cooling time for the solder joint, the two pieces to be joined together must be maintained rigidly supported so that no relative movement occurs between the connector and conductor. Any such movement will result in an inferior joint being formed between the connector and conductor.

Thus, it is important during the tinning operation of large-diameter cables, i.e., those in excess of 8 gauge, to adequately heat sink the cable conductor during a tinning operation. Further, during the operation of sweating a connector to the cable, which requires large amounts of heat, it is necessary to maintain the connector and conductor in rigid alignment until the solder has safely cooled to create a rigid bond with the conductor and connector.

SUMMARY OF THE INVENTION

It is an object of this invention to provide a soldering fixture to support a cable conductor during a soldering operation.

It is a more specific object of this invention to provide a fixture which supports a large diameter cable during a conductor tinning operation.

It is yet another object of this invention to provide a soldering fixture for supporting a cable conductor during the soldering of a connector to the conductor.

It is still another object of this invention to provide a fixture which holds a conductor and a connector in rigid alignment during the soldering process.

These and other objects of the invention are provided by an apparatus which supports a large cable conductor during a soldering operation. The apparatus includes a heat sink associated with a cable conductor support for maintaining the portion of the cable adjacent the conductor cooled during a soldering operation.

In accordance with the preferred embodiment, the heat sink includes two channels of different dimensions for supporting two sizes of cables. The heat sink includes a chamber for receiving a pumped coolant. The pumped coolant is recirculated through a radiator. The heat sink maintains the cables at a safe operating temperature during the solder operation, avoiding any damage to the cable shields or insulation.

The heat sink supports the cable conductor in alignment with a tool elevator which moves towards and away from the supported conductor along an axis of the conductor. A solder pot may be supported on the tool elevator which can be raised along the axis of the conductor until the conductor is immersed in molten solder. Alternatively, the tool elevator may support a chuck for holding a connector which is being soldered to the cable conductor.

In a preferred embodiment of the invention, a common heat sink supports one of two different sizes of cable during a soldering operation. Two tool elevators are provided, which can raise and lower a tool along the axis of the cable conductors. Depending on the wire size, either tool elevator may include a solder pot having an axis coincident with one of the supported cable conductor axes, or a connector chuck having an axis coincident with the supported conductor axis.

Each tool elevator can be positioned to a plurality of vertical positions, permitting the tool supported on each tool elevator to be accurately aligned with a cable conductor. The alignment may be maintained during the solder operation to avoid any misalignment before the solder cools.

DESCRIPTION OF THE FIGURES

FIG. 1 illustrates a front view of a soldering fixture in accordance with the preferred embodiment.

FIG. 2 is a side view of the soldering fixture of FIG. 1.

FIG. 6 illustrates the solder fixture of FIG. 1 having a connector chuck connected to the end of the elevator.

FIG. 7 illustrates a first step in the process of soldering a connector to a cable.

DESCRIPTION OF THE PREFERRED EMBODIMENT

Figure 3:
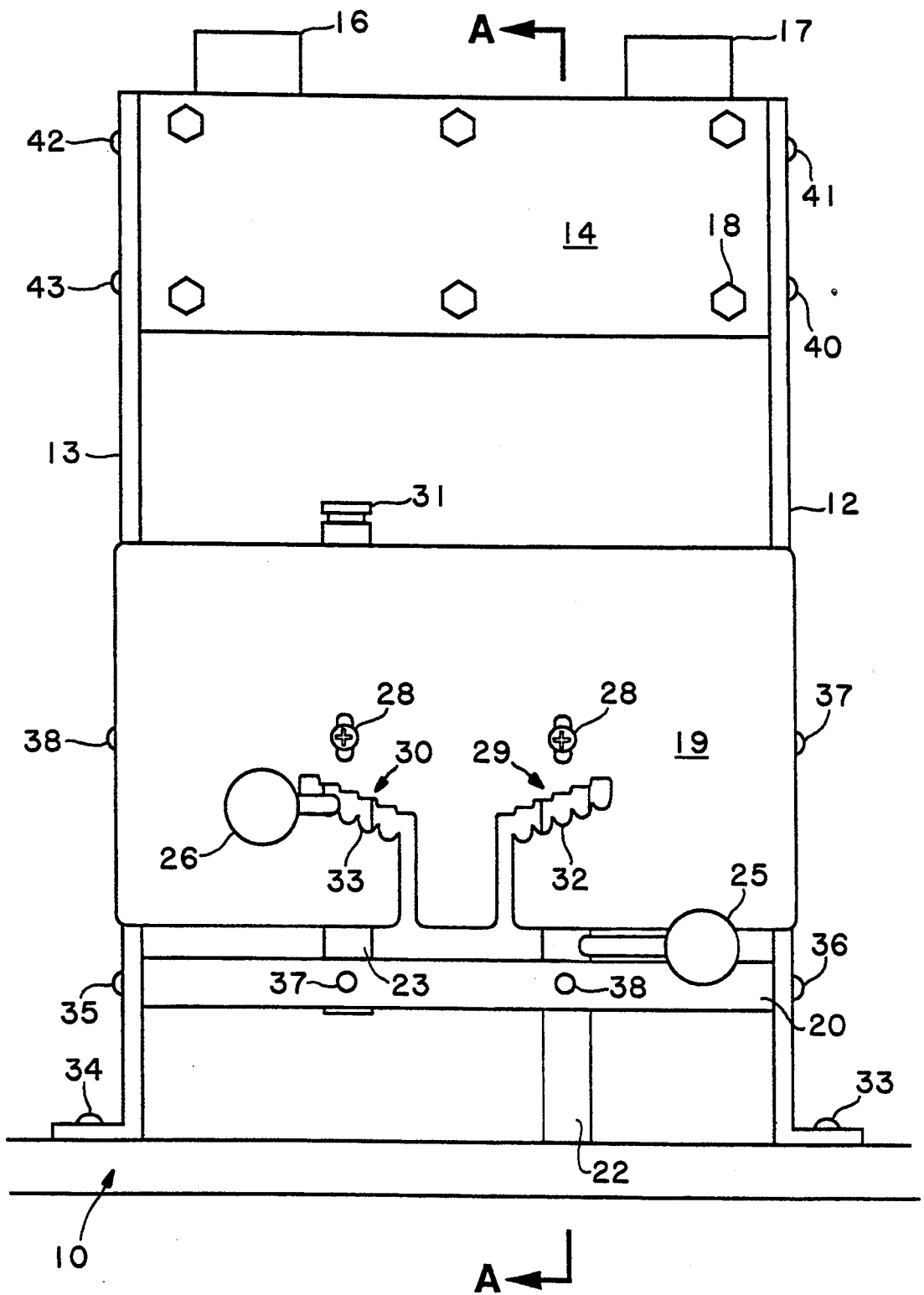
FIG. 3 shows in greater detail a plan view of the tool fixture of FIG. 1.

Referring now to FIGS. 1 and 2, there are shown front and side views of a cable soldering fixture in accordance with a preferred embodiment of the invention. The cable soldering fixture includes a heat sink 14 which is cooled by a pumped fluid entering inlet 17 and exiting outlet 16. The fluid is pumped by a cooling system 15 which releases the heat contained within the coolant through a radiator.

The heat sink 14 supports one of two different size cables so that exposed conductor of this cable lies along the axis of one of the two tool elevators 22 and 23. Tool elevators 22 and 23 are supported for vertical movement by guide plates 20 and 21. The entire structure of guide plates 20, 21 and heat sink 14 are supported by vertical side plates 12 and 13.

The alignment of the tool elevators 22 or 23 with the axis of the conductor permits various tools used during the soldering process to be accurately aligned with respect to the axis of a cable conductor.

Each of the elevators 22 and 23 includes a handle 25, 26 which can position the elevator vertically with respect to a supported cable conductor. A panel 19 supported by each of the vertical side plates 12 and 13 includes a plurality of staggered slots 29, which can receive a respective handle 25, 26 of a tool elevator. Panel 19 is supported to the guide plate 21 with suitable fasteners 28.

The staggered slots 29 permit vertical positioning of the handle 25 and therefore the positioning of the tool elevator with respect to the supported conductors.

The fixture 11 and the coolant system 15 is supported on a sheet metal base 10. Various fasteners 36 and 37 are shown which support the vertical side plates 12 and 13 to the heat sink 14 and guide plates 20 and 21.

Referring now to FIG. 3, the positioning mechanism for maintaining each of the tool elevators in a respective vertical position is shown. The two vertically extending slots 29 and 30, have a plurality of positions 32 and 33 for fixing the position of the handles 25 and 26. Thus, during a soldering operation, the vertical position of the tool-bearing end of the tool elevator can be maintained fixed to permit solder cooling or other processes to take place.

In operation, the device in accordance with FIGS. 1 through 3 can be used to either tin cable conductors supported in the heat sink 14, or to position a connector over the conductor during a soldering operation, and maintain the connector positioned relative to the conductor until the connector has cooled.

Figure 4:
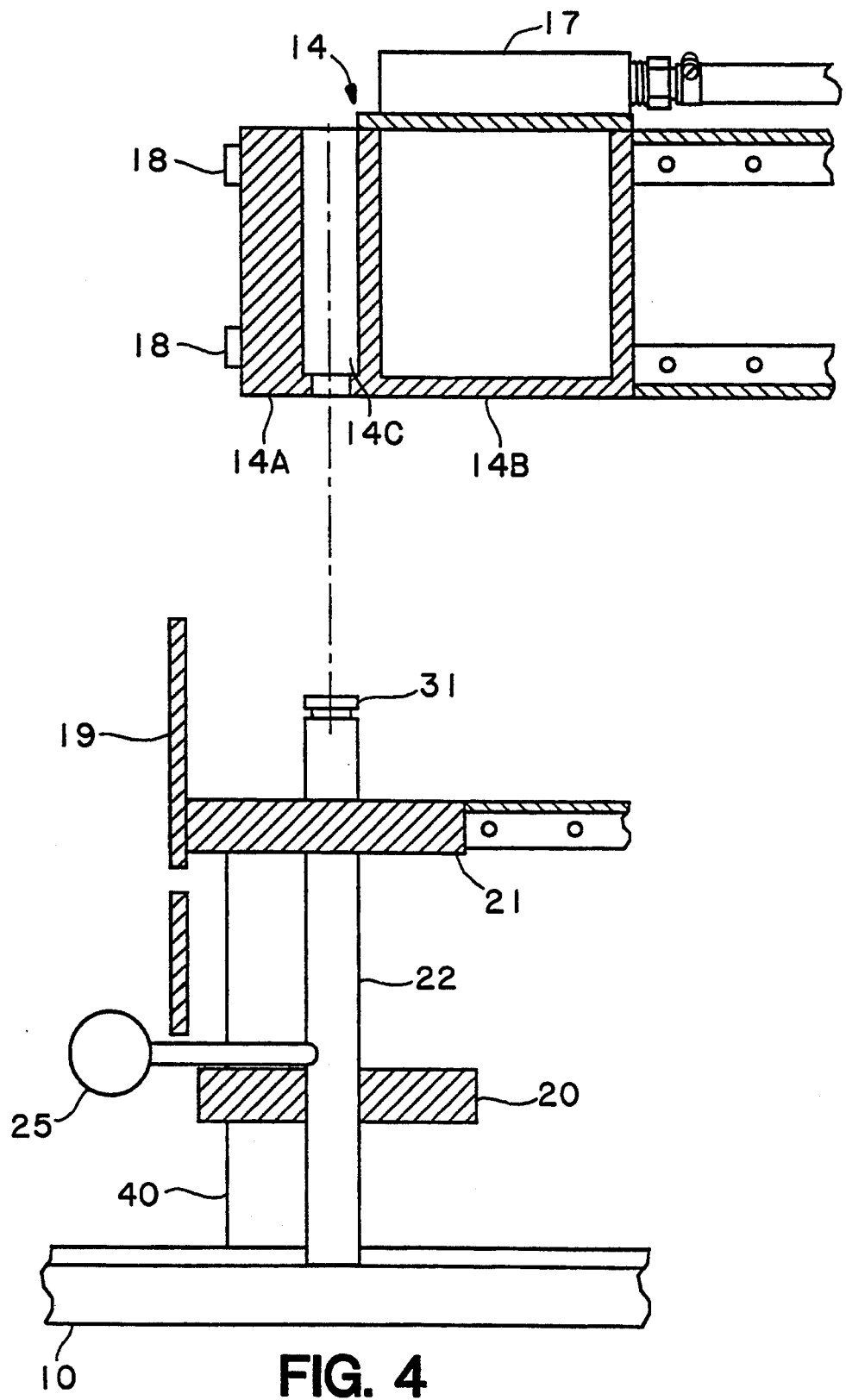
FIG. 4 is a section view of FIG. 3 taken along lines A—A.

Referring to FIG. 4, the axis of the tool elevator 22 is coincident with the axis of a groove 14c provided in the surface of heat sink 14. As will be evident from other Figures, the cable supported within groove 14c also has an axis coincident with the tool elevator 22 axis.

At the top of the tool elevator 22 is shown a fixture 31, which provides a shoulder on which a tool may be supported.

Figure 5:
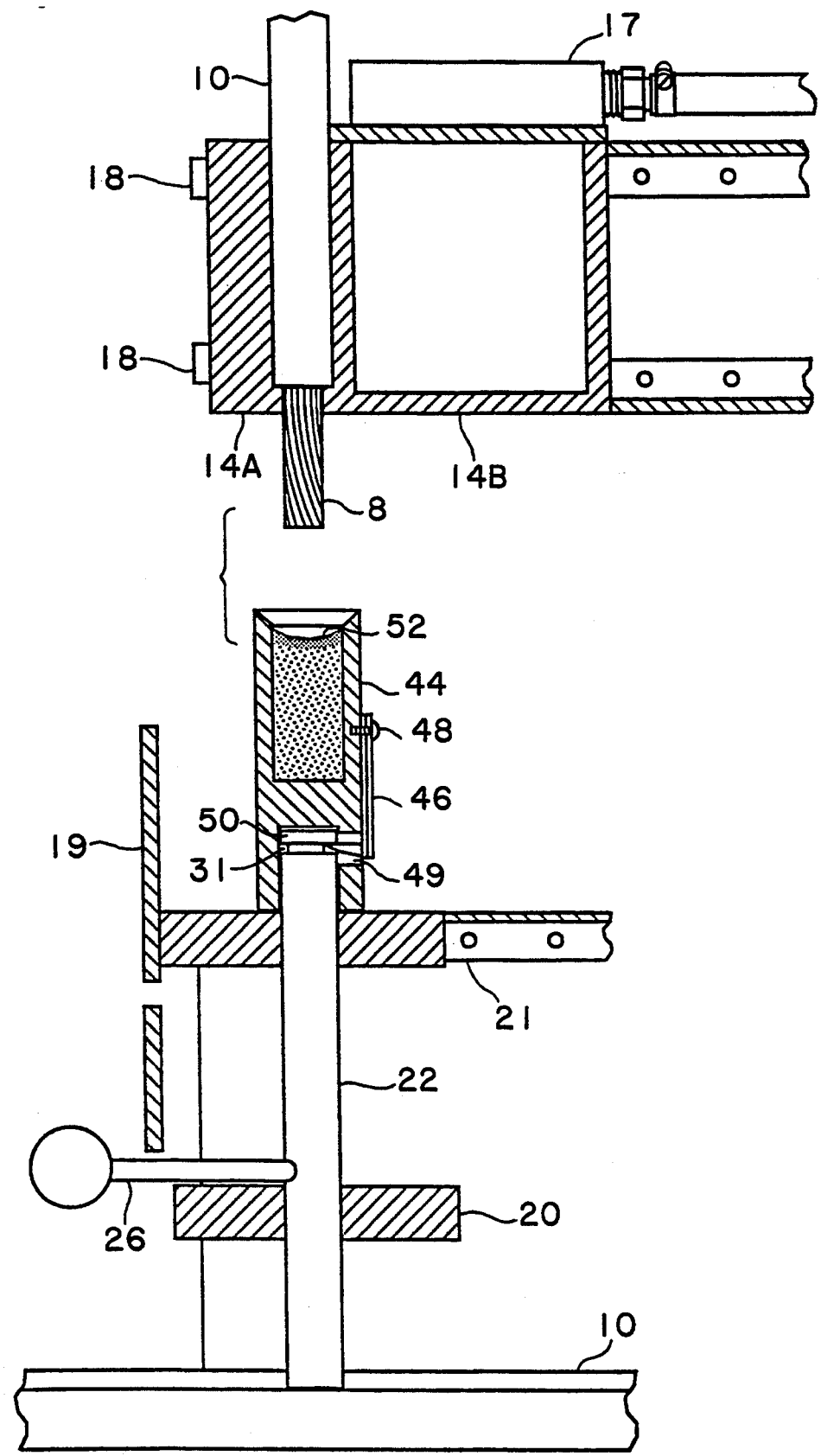
FIG. 5 is a second section view of the apparatus of FIG. 3 used during a tinning operation.
Figure 9:
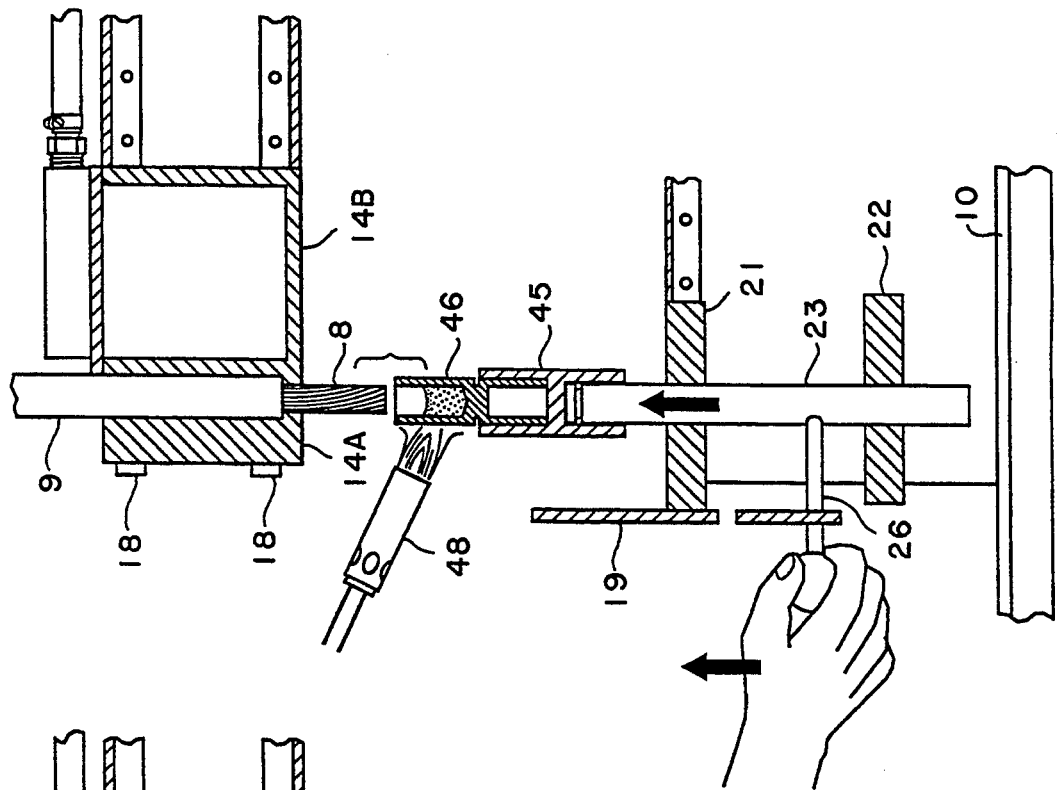
FIG. 9 illustrates a third step in the process of soldering a connector to a cable.

The beginning steps of a tinning operation are shown in FIG. 5. A solder pot which has a cavity 44 is connected to the fixture 31. The cavity receives molten solder 52. A bi-metallic catch 46 is shown which is secured to the body of the solder pot 44 with a fastener 48. The bi-metallic catch 46 maintains the solder pot 52 connected to the fixture 31. The shoulder 50 of the fixture 31 is grasped by the tang 49 of the bi-metallic catch 46. Thus, when the pot 44 is heated to contain the molten solder 52, the tang 49 of the bi-metallic catch 46 engages fixture 31. Once the solder pot 44 has cooled, the bi-metallic catch 46 releases the solder pot 44 from the tool fixture 31.

The solder pot 52 may be raised so that the conductor 8 is tinned with the molten solder 52. The sheath of the cable 10 is protected from excessive heat as well as from wicking of the solder by the heat sink 14. The heat sink 14 includes an interior section 14b containing the coolant supplied through inlet 17. The removable portion 14a of the heat sink is held in place with screws 18, as will be evident from the remaining Figures.

The soldering fixture may also be used to position a solderable connector over a tinned conductor 8. FIG. 6 illustrates the use of a chuck 45 supported on the end of a tool elevator 23. Chuck 45 supports a connector 46, which can be positioned during a soldering operation to receive the conductor 8. FIG. 7 illustrates the chuck 45, and connector 46 before positioning for a solder operation.

Figure 8:
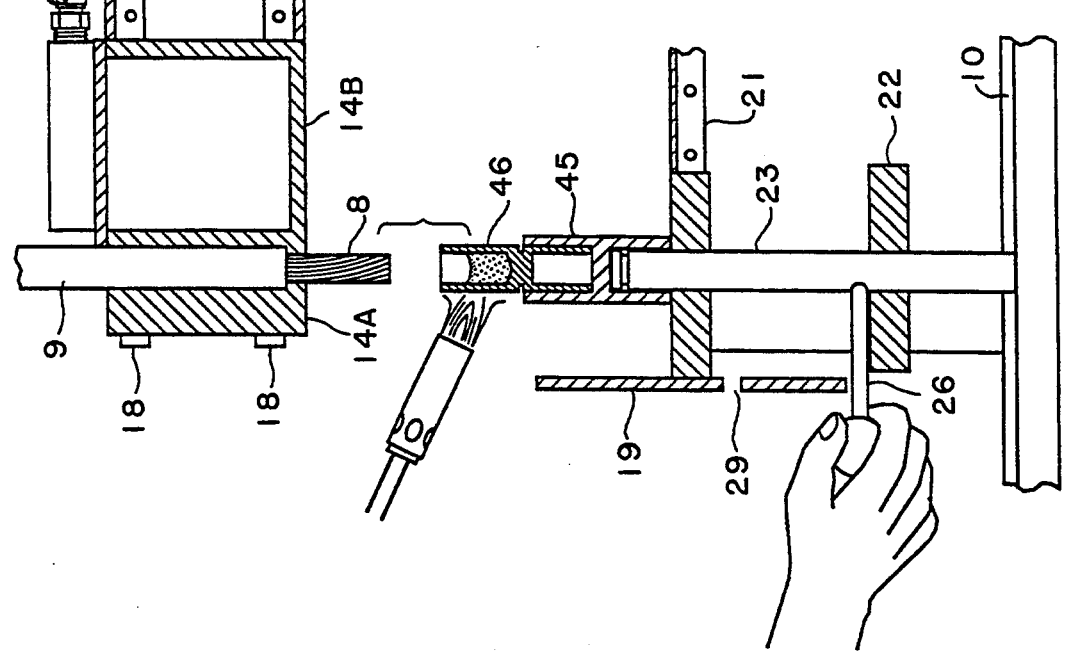
FIG. 8 illustrates a second step for soldering a connector to a cable.
Figure 11:
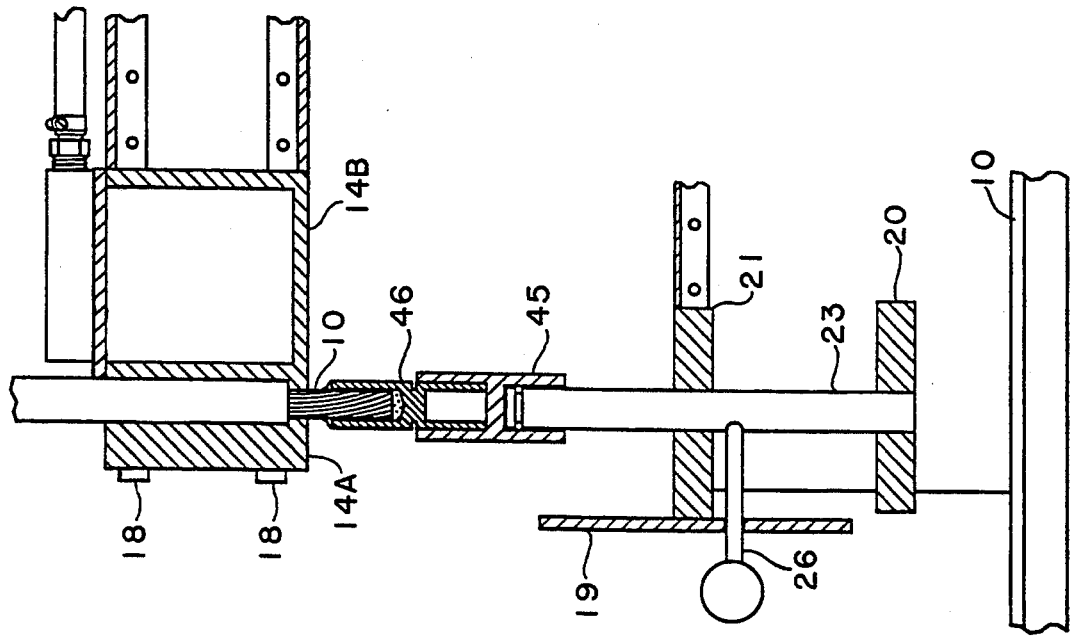
FIG. 11 illustrates a fifth step in soldering a connector to a cable.
Figure 10:
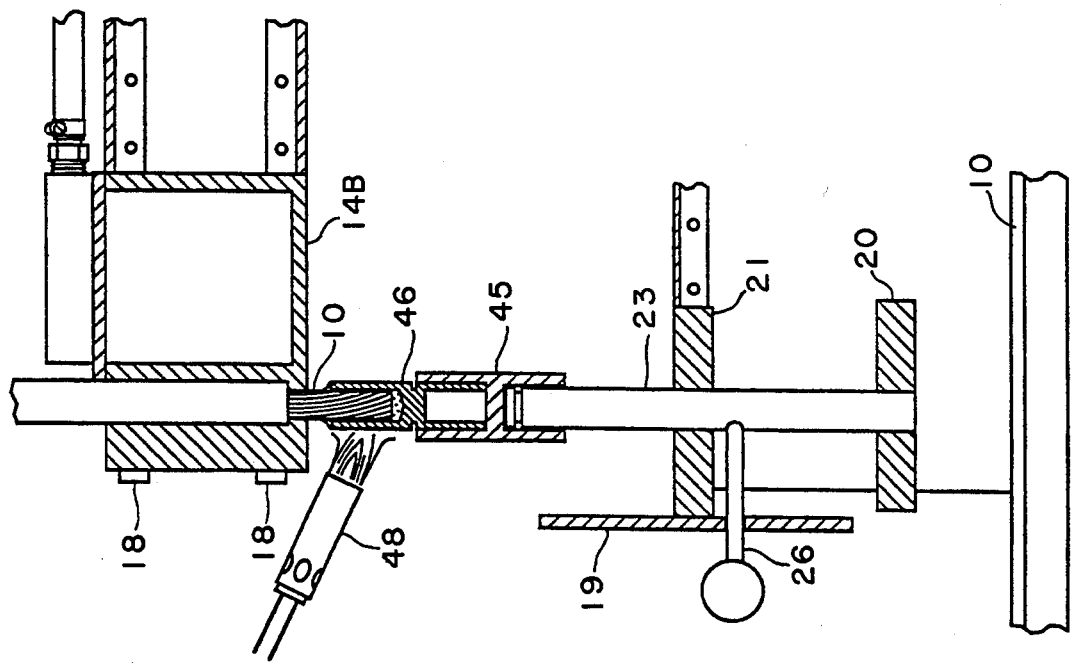
FIG. 10 illustrates a fourth step in soldering a connector to a cable conductor.

FIGS. 8, 9, 10 and 11 illustrate the process of soldering a connector to the conductor 8. In FIG. 8, the connector 46 is heated and includes a quantity of flux and solder therein. As the solder melts, the handle 26 is raised in FIG. 9 to position the connector 46 to receive conductor 8. FIG. 10 illustrates the process of sweating the connector 46 to the conductor 8, using a blowtorch. In FIG. 11, the conductor pin 46 is maintained in position, permitting the solder to cool. FIGS. 10 and 11 illustrate how the horizontal vertically ascending slots 29 in the panel 19 support handle 26, so that no movement is experienced during the final critical steps of soldering the connector 46 to the conductor 10.

Figure 12:
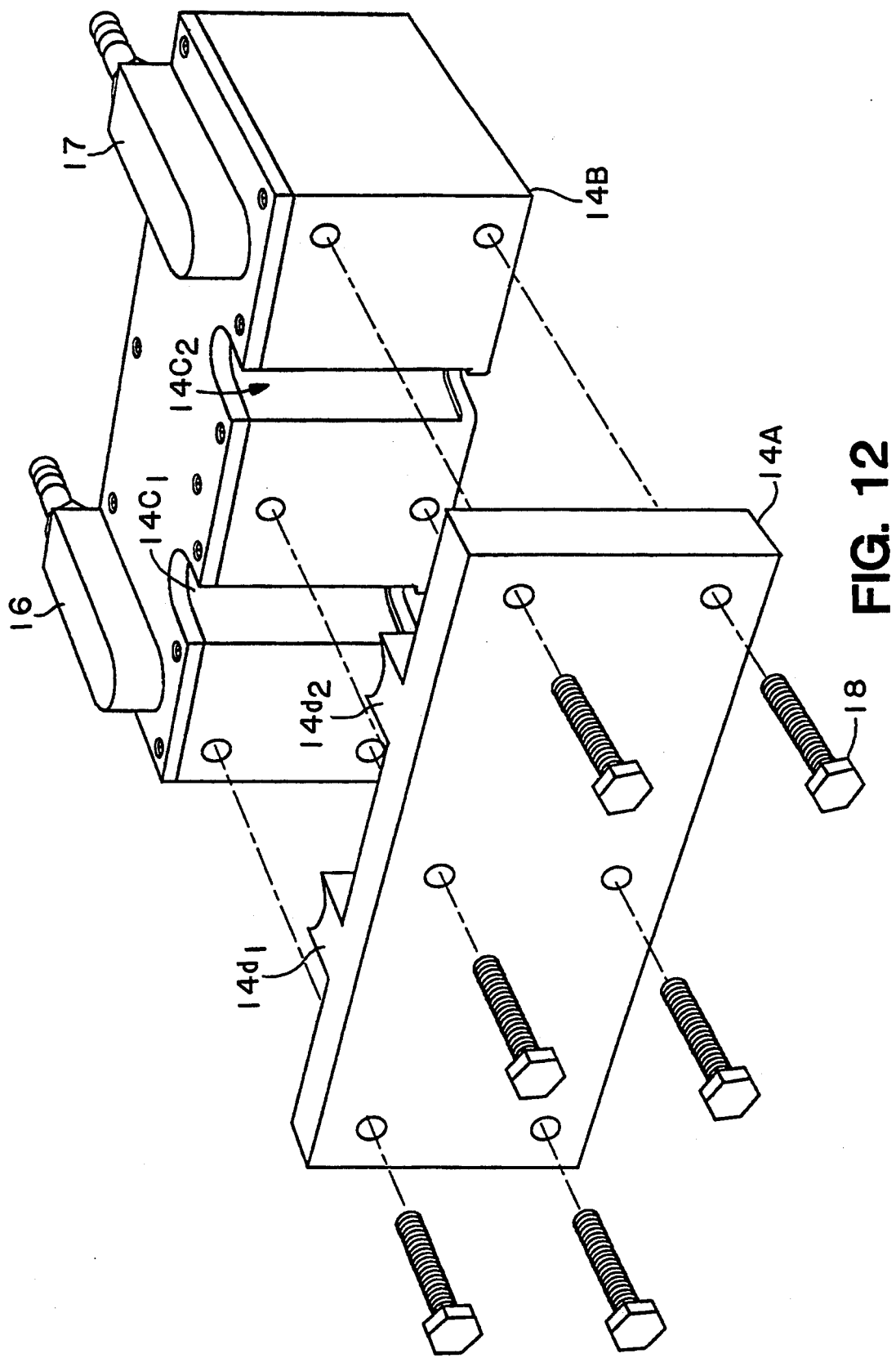
FIG. 12 is an exploded view of the heat sink 14.

FIG. 12 is an exploded view of the heat sink 14. The heat sink 14 includes a coolant chamber 14b connected to inlet 17 and outlet 16. One of the grooves $14c_1$ and $14c_2$ in the face of the coolant chamber 14b receives the cable bearing the conductor to be soldered. The cable is held in place by one of ridges $14d_1$, $14d_2$ in the clamping surface 14a. The fasteners 18, grooves $14c_1$, $14c_2$ and ridges $14d_1$, $14d_2$ in the clamping surface 14a captivate first and second conductors, so that the axis of the conductors is coincident with the axis of the tool elevators.

Figure 13:
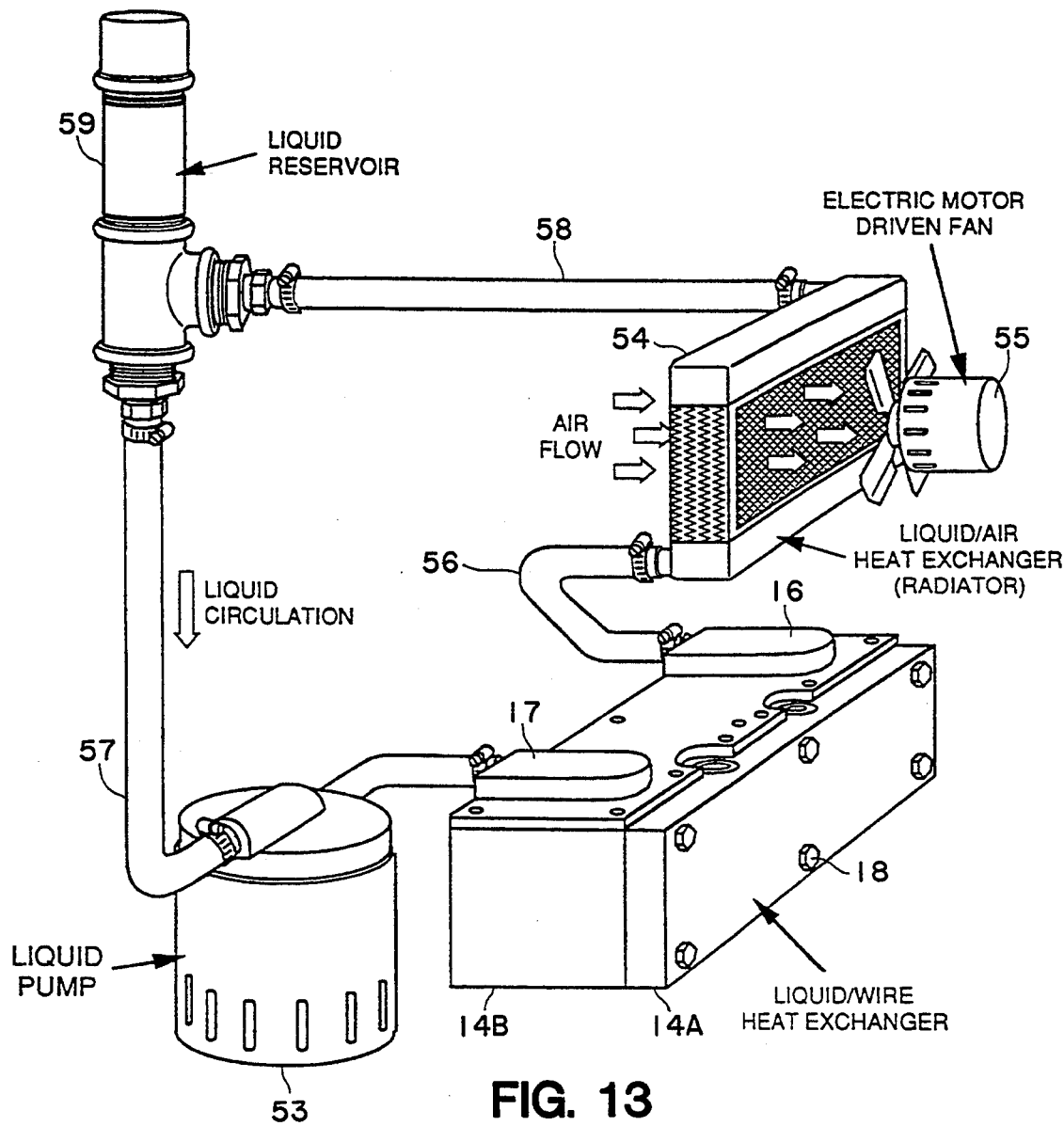
FIG. 13 illustrates in detail the cooling system used to pump coolant through the heat sink 14.

The pumped cooling system is illustrated more completely in FIG. 13. The system includes the heat sink 14 connected through its inlets and outlets 17 and 16, respectively, to a liquid pump 53 and liquid/air heat exchanger 54. The liquid pump 53 pumps fluid from a liquid reservoir 59 through the cooling chamber 14b of the heat sink 14. Heat removed from the cable during the soldering operation is exchanged with the outside air as the coolant is pumped through the heat exchanger 54. Fan 55 creates an air flow which transfers the heat from the pumped coolant as it passes through heat exchanger 54 to the ambient air.

Thus, the device in accordance with the preferred embodiment, will maintain the temperature of the cable adjacent the region to be soldered at a safe temperature, avoiding solder wicking and any damage to the sheath or insulation of the cable. The device will also maintain the cable and connector in rigid alignment. Those skilled in the art will recognize yet other embodiments of the invention, described more particularly by, but not limited to, the claims which follow.

What is claimed is:

1. A cable soldering fixture for supporting a cable conductor during a soldering operation comprising:
   a support frame;
   a heat sink supported on one end of the support frame, said heat sink supporting a cable conductor parallel to the axis of said support frame;
   a guide plate means supported on an opposite end of said support frame; and,
   a tool elevator connected to said guide plate means, movable along an axis coincident with said cable conductor, for supporting a tool in alignment with said cable conductor.

2. The cable soldering fixture of claim 1 wherein said tool elevator includes positioning means for adjusting the distance between said tool and cable conductor.

3. The cable soldering fixture of claim 2 wherein said positioning means includes a handle which moves said elevator in the direction of said cable conductor, and a plate connected to said frame having a plurality of staggered slots through which said handle passes, said staggered slots providing a support for said handle which position said tool at a plurality of distances from said cable conductor.

4. The cable soldering fixture of claim 3, wherein said tool comprises a chuck for supporting a connector pin in alignment with said cable conductor.

5. A cable soldering fixture for supporting first or second cable during a soldering operation comprising:
   a support frame including at one end thereof a heat sink which holds said first or second cable in parallel alignment;
   guide plate means supported at a second end of said support frame, said guide plate means supporting first and second tool elevator means for movement along an axis of said first and second cables;
   a solder pot supported by either of said tool elevator means for a tinning operation;
   a connector chuck supported on said tool elevator means for a soldering operation; and,
   means for moving said tool elevator so that said solder pot is aligned with said cable for tinning a conductor of said cable, and so that a connector supported by said chuck receives a conductor of said cable during a soldering operation.

6. The cable soldering fixture of claim 5, wherein said means for moving said tool elevator independently moves said solder pot or connector into alignment with said first or second cable conductors.

7. The cable soldering fixture of claim 6, wherein said solder pot is fixed to said tool elevator by a heat-sensitive bi-metallic clamp which operates when said solder pot temperature is above a predetermined level.

8. The cable soldering fixture of claim 5, wherein said means for moving said tool elevator means comprises:
   first and second handles connected to said first and second elevator means; and,
   first and second adjustable supports for maintaining said handles in a position which aligns said solder pot and connector with respect to said first and second cables.

9. A cable soldering fixture for supporting a cable conductor in alignment with a connector during a soldering operation comprising:
   a support frame including a heat sink which holds a cable conductor in a vertical orientation;
   a connector elevator supported by guide plate means connected to said support frame, said connector elevator supporting said connector for vertical movement in alignment with said cable conductor, whereby said cable conductor is received in said connector; and,
   means for maintaining said connector elevator in a fixed position when said cable conductor is received in said connector during soldering of said connector and conductor.

10. The cable soldering fixture of claim 9, wherein said means for maintaining said connector elevator in a fixed position comprises:
    a horizontally extending handle connected to said connector elevator; and,
    means for holding said handle in one of a plurality of vertical positions.

11. The cable soldering fixture of claim 10, wherein said means for holding said handle is a plate having a plurality of vertically staggered supports for maintaining said handle in one of a plurality of raised positions.

12. The cable soldering fixture of claim 9, wherein said heat sink comprises:
    a coolant chamber having an exterior surface grooved to receive said cable; and,
    a clamping surface having a ridge facing said coolant chamber groove, said clamping surface and exterior surface maintaining said cable oriented along an axis of said groove and ridge.

13. The cable soldering fixture of claim 12, wherein said coolant chamber has an inlet and outlet which receives and discharges a pumped coolant.

* * * * *